Patented Sept. 7, 1937

2,092,399

UNITED STATES PATENT OFFICE 2,092,399

DYESTUFFS OF THE DIOXAZINE SERIES AND PROCESS OF PREPARING THEM

Georg Kränzlein, Heinrich Greune, Max Thiele, and Franz Brunnträger, Frankfort-on-the-Main-Hochst, Germany, assignors to General Aniline Works, Inc., New York, N. Y., a corporation of Delaware No Drawing. Application May 12, 1932, Serial No. 610,984. In Germany May 26, 1931

2 Claims. (Cl. 260—28)

The present invention relates to a new process of preparing dyestuffs which probably represent oxazines and to new dyestuffs prepared thereby.

Our new process consists in heating at a temperature of about 150° C. to about 300° C. a 1,4-benzoquinone in which the 2- and 5-positions may be substituted by halogen and in which the 3- and 6-positions may be substituted by halogen, alkyl or an aryl of the benzene series with an aromatic primary amino compound containing at least one unsubstituted ortho-position to the amino group and, if desired, sulfonating the products thus obtainable. Thus, dyestuffs are obtained which may be characterized by the general probable formula:

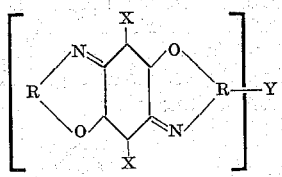

wherein X represents hydrogen, halogen, alkyl or aryl, R represents an arylene group and Y means that the dyestuffs may be sulfonated.

According to the present invention the reaction components are advantageously heated in the presence of a solvent or diluent boiling at a temperature above about 150° C. There may be used, for instance, dichlorobenzene, trichlorobenzene, nitrobenzene or mono-nitronaphthalene. The reaction generally occurs in such a way that at the beginning of the heating operation the reaction components enter into solution and the oxazine dyestuff after a longer heating period is precipitating from the solution. In some cases it is advantageous to carry out the reaction in the presence of a condensing agent and an oxidizing agent, such as dinitrophenol or picric acid.

By using such reaction components as condense with aromatic amines with the elimination of hydrochloric acid, for instance, chloranil, it is furthermore advantageous to use an acid binding agent, as, for instance, sodium acetate, which at the same time acts as a condensing agent.

We have found that according to our process a number of new substances are obtainable as, for instance, the products corresponding with the general probable formula

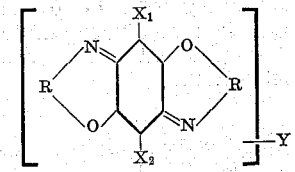

wherein $X_1$ represents alkyl or aryl, $X_2$ hydrogen, halogen, alkyl or aryl, Y means that the compounds may be sulfonated, and R represents an arylene group of the benzene, naphthalene, carbazole or diphenylamine series, said arylene groups being bound in ortho positions to the oxygen and nitrogen atoms of the molecule and containing no hydroxy and carboxy groups in ortho-positions to each other.

The following examples serve to illustrate the invention, but they are not intended to limit it thereto, the parts being by weight:

(1) 420 parts of 3-amino-N-ethylcarbazole are dissolved, while heating, in 20 times their weight of trichlorobenzene. To this solution 170 parts of finely pulverized sodium acetate free from water of crystallization and 250 parts of chloranil are added. The whole is then boiled for 5 hours. The condensation product which has separated is filtered by suction, while hot, washed with warm trichlorobenzene, alcohol and water and dried. It forms a compound of metallic lustre which crystallizes in the form of green needles dissolving in hot organic solvents of high boiling point, such as trichlorobenzene, to a solution showing an intense red fluorescence. By finely dispersing the said dyestuff crystals, a pigment is obtained which is especially suitable in dyeing, for instance, wallpaper and in printing, and which has the advantage of being very fast to light and to solvents and of possessing a great tinctorial power.

When sulfonating the product by means of strong sulfuric acids, more or less highly sulfonated, water-soluble blue dyestuff sulfonic acids are obtained which dye the animal, vegetable and artificial fiber as well as mixed fabrics tints of very good fastness to light. The barium-, calcium or other suitable salts of the said sulfonic acids are valuable blue pigment dyes.

(2) 50 parts of 3-amino-N-ethylcarbazole, 30 parts of chloranil and 20 parts of sodium acetate free from water of crystallization are heated in 1000 parts of trichlorobenzene at 180° C.–190° C. for 5 hours while adding 40 parts of dinitrophenol. After cooling to 150° C., the condensation product which has separated in a good yield, is filtered by suction, washed with alcohol and water and dried. The product thus obtained is identical with that obtained according to Example 1.

By using instead of 3-amino-N-ethylcarbazole the corresponding quantity of 3-amino-carbazole, there is obtained a condensation product which, when sulfonated, dyes the fiber violet tints of very good fastness to light.

(3) 184 parts of para-aminodiphenylamine and 92 parts of phenyl-1.4-benzoquinone are boiled for some hours in 1000 parts of trichlorobenzene. After cooling, the condensation product, thus formed, is filtered by suction, washed with trichlorobenzene and alcohol, extracted by means of boiling water and dried. It is then purified by boiling with alcohol and alkali and a product is thus obtained which dissolves in sulfuric acid to a blue solution and is precipitated in the form of blue flakes, when the solution is diluted with water. By sulfonating it with strong sulfuric acid, sulfuric acid monohydrate or fuming sulfuric acid a more or less highly sulfonated dyestuff sulfonic acid is obtained having the following probable constitution:

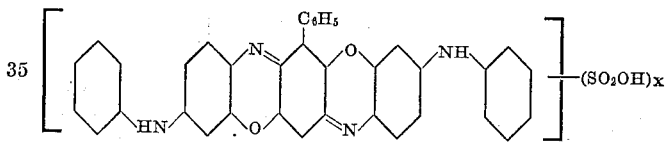

wherein X means that the dyestuff contains one or more sulfonic acid groups. It dyes the animal, vegetable and artificial fiber as well as mixed fabrics beautiful blue tints.

(4) 25 parts of chloranil, 18,6 parts of aniline and 16,4 parts of anhydrous sodium acetate are introduced into 400 parts of trichlorobenzene. The whole is then boiled, while stirring, for some hours. After cooling to 150° C., it is filtered by suction and the solid matter is purified by extracting it by means of alcoholic alkali. There remains a dark product which dissolves in strong sulfuric acid to a clear blue solution and which, when diluted with water, is precipitated again in the form of red flakes.

(5) 25 parts of chloranil, 26 parts of meta-chloraniline and 17 parts of sodium acetate (anhydrous) are introduced into 250 parts of trichlorobenzene. The whole is then boiled, while stirring, for a prolonged time. After cooling, the precipitate thus obtained is purified by extracting it by means of hot alcoholic alkali. There is obtained as residue a compound having a brown color and dissolving in concentrated sulfuric acid to a blue solution.

(6) 22 parts of 1.4-benzoquinone and 57 parts of beta-naphthylamine are introduced at ordinary temperature into 500 parts of nitrobenzene. Thereupon, the whole is boiled for 2 hours, 15 parts of dinitrophenol are added and the whole is again boiled for some hours. After cooling, it is filtered by suction, the solid matter is first washed with alcohol and subsequently purified by extracting it by means of hot alcoholic alkali. There is obtained a compound dissolving in concentrated sulfuric acid to a clear blue solution.

(7) 9,6 parts of beta-anthramine, 6,2 parts of chloranil and 4,1 parts of anhydrous sodium acetate are introduced at ordinary temperature into 150 parts of trichlorobenzene. The whole is boiled for a prolonged time. After cooling, it is filtered by suction, the solid matter is first washed with alcohol and then with water and dried. It forms a dark powder dissolving in strong sulfuric acid to a red-brown solution and being precipitated from the sulfuric acid solution by means of water in the form of olive-green flakes. By suitable sulfonation, a dyestuff sulfonic acid is obtained dyeing wool and cotton olive-green tints.

(8) A mixture of 180 parts of nitrobenzene, 17 parts of para-amino-diphenyl and 9,2 parts of phenylbenzoquinone is gradually heated to boiling, while stirring, and boiling is continued for a prolonged time. After cooling to 170° C., it is filtered by suction and the solid matter thus obtained is washed with alcohol and then dried. It forms a compound which crystallizes in the form of brownish-green needles dissolving in strong sulfuric acid to a blue solution. By suitable sulfonation, a water-soluble sulfonic acid is obtained dyeing the animal, vegetable and artificial fiber beautiful ruby-red tints of good fastness to light.

(9) A mixture of 150 parts of trichlorobenzene, 6,2 parts of toluquinone and 14,3 parts of beta-naphthylamine is heated at 80° C., while stirring, for 2 hours, thereupon 5 parts of picric acid are added thereto, the whole is boiled for a prolonged time and after cooling, the condensation product thus precipitated is filtered off. It dissolves in concentrated sulfuric acid to a blue solution. By sulfonating it with sulfuric acid monohydrate or fuming sulfuric acid or strong sulfuric acid, a sulfonic acid is obtained which probably has the following constitution:

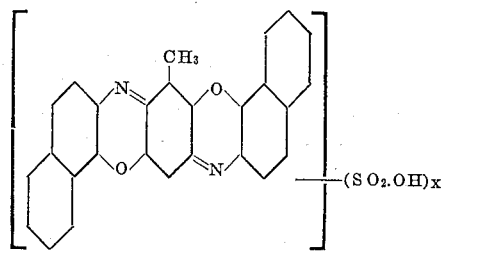

wherein X means that the dyestuff contains one or more sulfonic acid groups, dyeing cotton red-violet tints of good fastness to light.

By using ethylbenzoquinone instead of toluquinone, a product is obtained having similar properties.

(10) 22,5 parts of 2.3.5-trichloro-6-methyl-1.4-benzoquinone and 42 parts of 3-amino-N-ethylcarbazole in 500 parts of nitrobenzene are stirred at 60° C.–70° C. for several hours, thereupon the whole is boiled for some hours. The condensation product thus precipitated is first washed with nitrobenzene, subsequently with alcohol and then dried. It forms a crystalline product showing a metallic lustre on the surface and dissolving in concentrated sulfuric acid to a violet solution which, when allowed to stand, turns green; by sulfonating the product in concentrated sulfuric acid or chlorosulfonic acid, or fuming sulfuric acid, a sulfonic acid is obtained which probably has the following constitution:

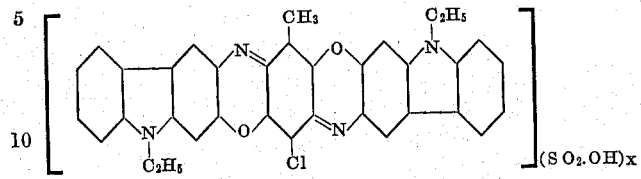(SO$_2$.OH)$_x$ wherein X means that the dyestuff contains one or more sulfonic acid groups dyeing wool, cotton or silk and mixed fabrics blue tints of very good fastness to light.

We claim:

1. The compound of the formula:

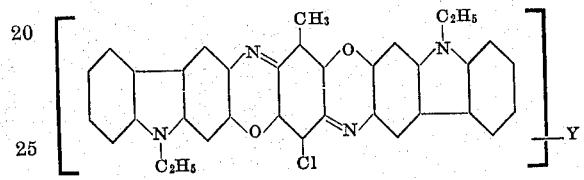Y wherein Y means that the dyestuff is sulfonated dyeing wool, cotton or silk and mixed fabrics blue tints of very good fastness to light.

2. A member of the group consisting of the compound of the formula:

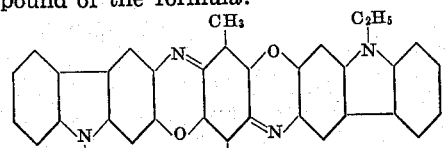

and sulfonic acids thereof.

GEORG KRÄNZLEIN.
HEINRICH GREUNE.
MAX THIELE.
FRANZ BRUNNTRÄGER.